United States Patent
Uyeno et al.

[19]

[11] Patent Number: 5,946,636
[45] Date of Patent: Aug. 31, 1999

[54] QUICK-RECOGNITION VISUAL NOTIFICATION SYSTEM FOR USE IN RADIOTELEPHONES

[75] Inventors: Shelley L. Uyeno, Brea; Travis Tran, Cypress; Yuli Yang, Fullerton, all of Calif.

[73] Assignee: Ericsson Inc., Research Triangle Park, N.C.

[21] Appl. No.: 08/720,823

[22] Filed: Oct. 2, 1996

[51] Int. Cl.[6] .............................. H04B 1/38; H04M 1/00
[52] U.S. Cl. ........................ 455/566; 455/567; 455/575
[58] Field of Search ............................ 455/90, 415, 566, 455/567, 414, 550, 575; 345/147, 158, 199; 379/127, 142, 245, 246, 247, 354

[56] References Cited

U.S. PATENT DOCUMENTS

| | | | |
|---|---|---|---|
| 4,044,546 | 8/1977 | Koike | 368/70 |
| 4,726,059 | 2/1988 | Havel | 379/354 |
| 4,845,745 | 7/1989 | Havel | 379/354 |
| 4,924,496 | 5/1990 | Figa et al. | 379/142 |
| 4,975,694 | 12/1990 | McLaughlin et al. | 340/825.44 |
| 4,982,424 | 1/1991 | Saito et al. | 379/376 |
| 5,070,521 | 12/1991 | Warner et al. | 455/415 |
| 5,515,420 | 5/1996 | Urasaka et al. | 455/564 |
| 5,553,125 | 9/1996 | Martensson | 455/412 |
| 5,703,934 | 12/1997 | Zicker et al. | 379/142 |

FOREIGN PATENT DOCUMENTS 02-336533 7/1992 Japan.

OTHER PUBLICATIONS

Phone Disc '95, User Manual;Digital Directory Assistance, Inc., 6931 Arlington Rd., Suite 405, Bethesda, MD 20814–5231, 1995.

CD USA Quick Start Guide, American Business Information, 5711 South 86th Circle, Omaha, NE 68127, 1997.

*Primary Examiner*—Nguyen Vo
*Attorney, Agent, or Firm*—Coats & Bennett, PLLC

[57] ABSTRACT

The present invention relates to a quick-recognition visual notification system for use in telephonic communication devices. Identification data, such as device ownership or the nature of the incoming communication, is communicated to and easily recognized by the owner or user of the device by utilizing the electronic circuitry of the device to assign distinct color-codes to identification data therein. The color-codes are then displayed on indicia, integral with the housing of the device, which indicates the nature of the identification data to the owner or user. Thus, the owner or user may quickly and easily identify their own telephonic communication device and the incoming communication, even at a distance away from the location of the device.

13 Claims, 6 Drawing Sheets

5,946,636

QUICK-RECOGNITION VISUAL NOTIFICATION SYSTEM FOR USE IN RADIOTELEPHONES

FIELD OF THE INVENTION

The present invention relates to radiotelephones and more particularly to a quick-recognition visual notification system for use in radiotelephones which utilizes color-codes to communicate identification data to the user.

BACKGROUND OF THE INVENTION

Radiotelephones are becoming increasingly prevalent in modern society. Included among the broad category of radiotelephones are mobile cellular telephones and conventional telephones with cordless handsets. One of the problems associated with the popularity of radiotelephones is that they are generally similar in color and shape. When two or more radiotelephones end up in a common place, such as a home or place of business, it may be difficult for the owners to identify their own radiotelephone without carefully scrutinizing name tag labels or display LCD's.

Another problem associated with the use of telephones in general is the identification of the nature or type of an incoming call when the user is at a distance away from the telephone. Currently, a method called "distinctive ringing" overcomes this problem by using different ringing frequencies and ringing patterns to indicate differences in incoming communications. However, as the number of categories into which the incoming communications must be distinguished increases, it becomes more difficult for the user to differentiate between the ringing frequencies and/or the ringing patterns associated with the categories of incoming communications. The aural basis of the distinctive ringing system may also make this method distracting to bystanders.

There is, of course, an advantage to the use of a color-code system to address both the problems of ownership identification and differentiation between different types of incoming communications. A color-code system is a visual method of identification which can be quickly recognized by the user, even at a distance, and is less distracting to bystanders than an aural method. Visual recognition by the user may also be further facilitated by the use of one or more sets of indicia integral with the housing of the radiotelephone which would permit viewing of the displayed color-code signals from different directions. Therefore, a color-coded visual notification system incorporated into a radiotelephone will provide a flexible and effective means for notifying the user of the nature of any identification data as well as any other events which may be amenable to such a coding scheme.

SUMMARY OF THE INVENTION

The present invention relates to a quick-recognition visual notification system for use in telephonic communication devices wherein identification data, such as device ownership, event alarms, or the nature of the incoming communication, is communicated to and easily recognized by the owner or user thereof. In its basic embodiment, the electronic circuitry of the device analyzes the identification data and assigns distinct color-codes thereto. The color-codes are then displayed on indicia, integral with the housing of the device, which indicates the nature of the identification data to the owner or user. Thus, the owner or user may quickly and easily identify their telephone, any event alarms, and the nature of any incoming communication, even at a distance from the telephone.

DETAILED DESCRIPTION OF THE INVENTION

Figure 1:
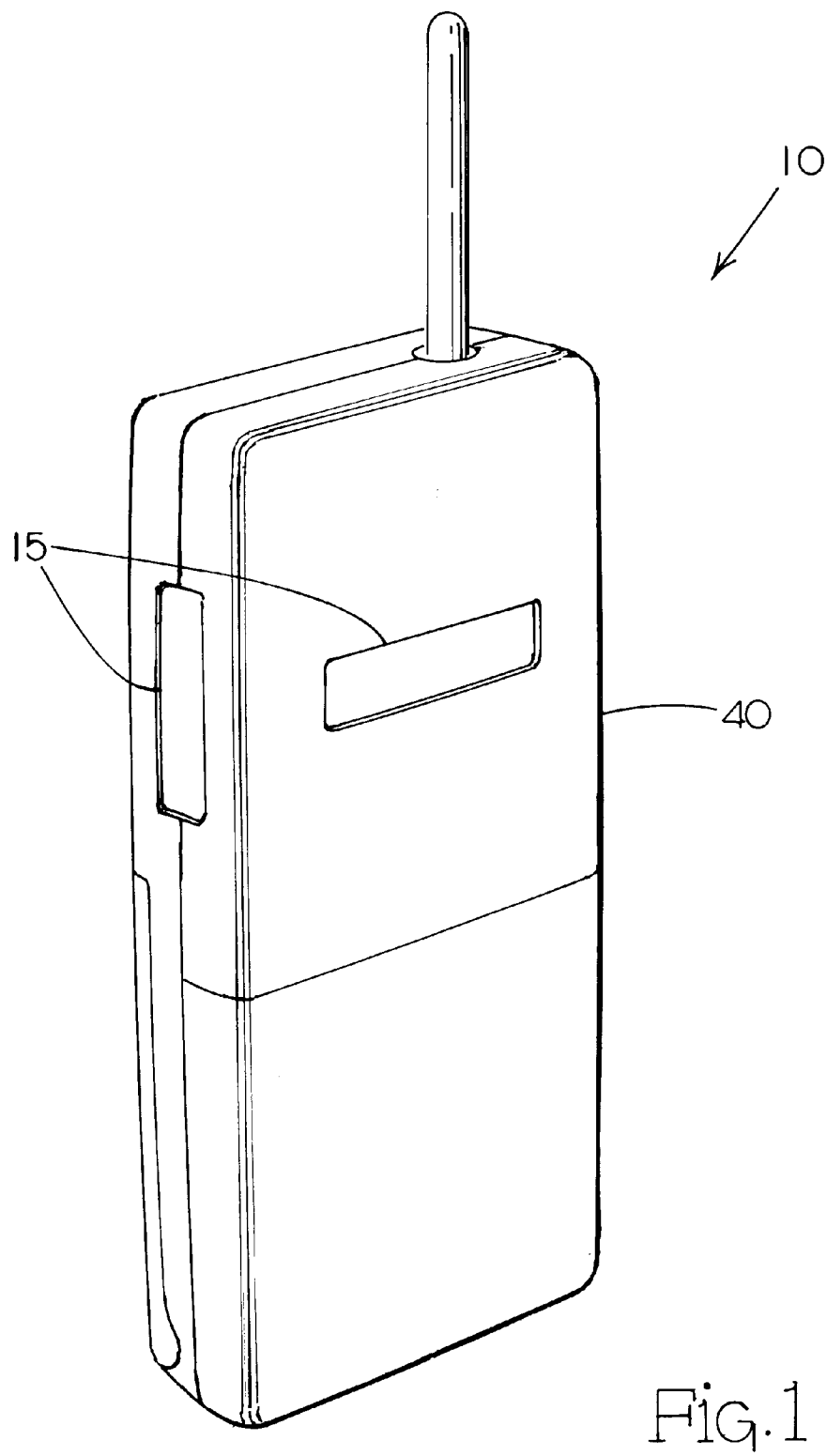
FIG. 1 is a perspective view of a radiotelephone showing indicia used to display color-codes as part of the visual notification system of the present invention.

With further reference to the drawings, FIG. 1 shows the quick-recognition visual notification system incorporated into a radiotelephone indicated generally by the numeral 10. Radiotelephone 10 is of a conventional design but includes one or more sets of color-coded indicia 15 formed in the housing 40 of the radiotelephone. Different forms of indicia, such as LCD's or LED's, can be utilized. Typically, a set of color-coded indicia 15 would have the capability of emitting a color-coded light signal that would include a series of different color. This can be accomplished by providing a bank of LCD's with the bank divided into color segments. For example, the bank of LCD's would be capable of emitting multi-color signals, such as red, blue, yellow, and orange, in either a flashing mode or a continuous mode. Alternatively, a bank of clear lights disposed beneath colored lenses may also be used.

The set of color-coded indicia 15 can be placed at various locations in and around the radiotelephone 10. In the embodiment illustrated in FIG. 1, the indicia sets 15 are disposed on the back and side panels of the radiotelephone 10. However, the indicia sets 15 may be placed in other locations, such as corners, to assure that emitted color-coded signals can be recognized from a distance irrespective of the position or orientation of the radiotelephone 10.

The quick-recognition visual notification or identification system for the radiotelephone 10 basically functions to color-code data. This data may include the identity of the owner of the radiotelephone 10, the identity of an incoming caller, reminder alarms for time or event, the presence of voice mail messages, memos, or telephone errors or diagnostics. Thus, the data is divided into separate groups and each group assigned a distinct color-code. Resulting color-codes would be communicated to the user through the indicia 15, visible externally to the radiotelephone 10, for indicating to the user the nature of any event included in the function of the radiotelephone 10.

Figure 2:
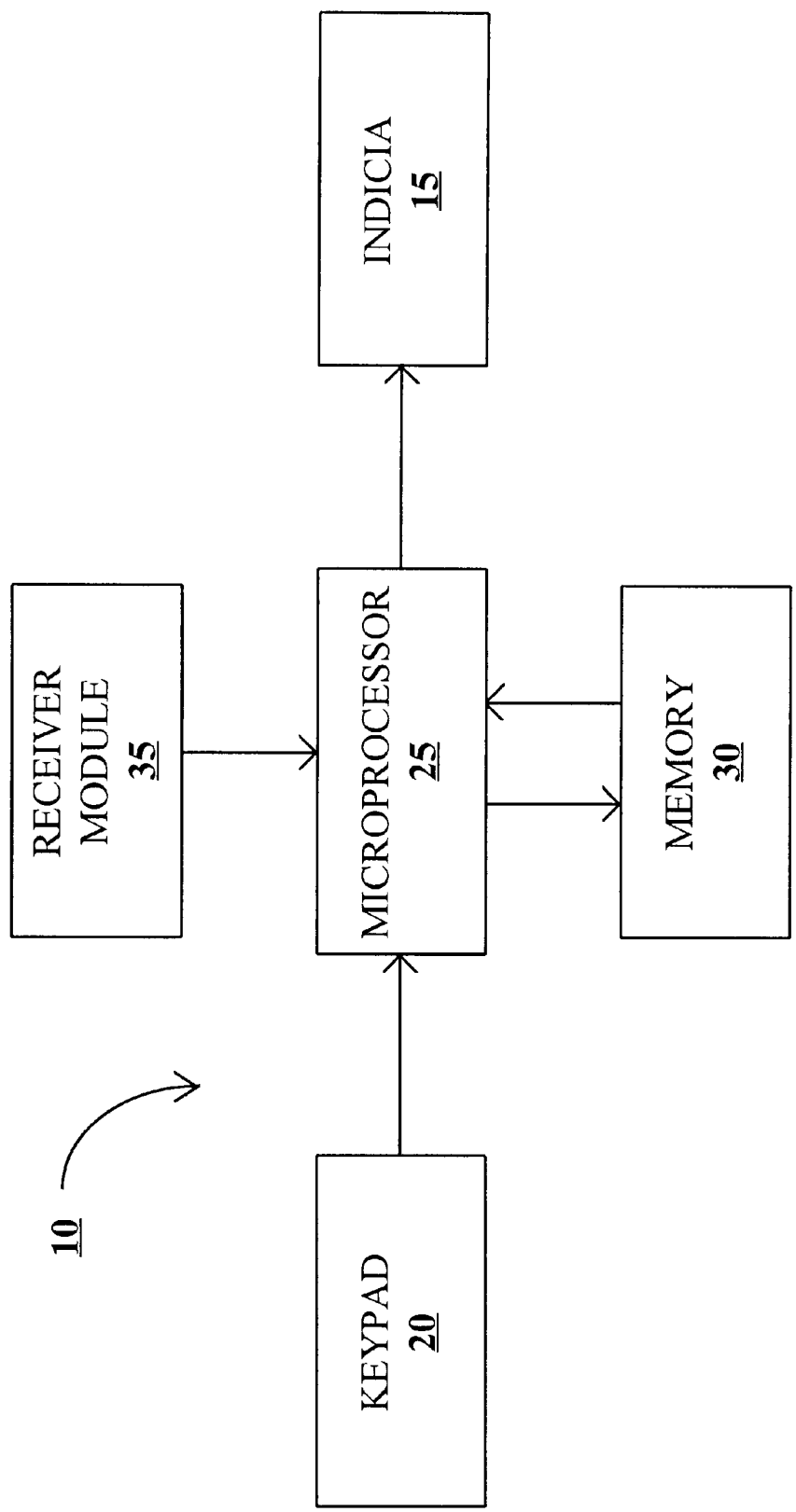
FIG. 2 is a schematic of the components of the visual notification system of the present invention.

FIG. 2 illustrates the basic color-coded signaling system of the present invention. A microprocessor 25 is centrally situated relative to an associated memory 30, the color-coded indicia 15, a keypad 20 and a receiver module 35. Microprocessor 25 is programmed to control the actuation and function of the color-coded indicia 15. In addition, data and information pertinent to the various functions of the system may be programmed into the microprocessor 25 via the keyboard 20 and this data and information may be stored in the associated memory 30. Once certain pertinent data and information is programmed into the microprocessor 25, then the microprocessor 25 can control the color-coded indicia 15 and ultimately dictate the color signals emitted by the indicia 15 for any particular mode of operation.

Keypad 20 of the radiotelephone 10 is used to program telephone numbers or other data into different groups or fields into the microprocessor 25 in accordance with the preferences of the user. Once the data is entered, either the user or the microprocessor 25 of the radiotelephone 10 assigns a distinct color-code to a field or sub-field. The data and the corresponding color-codes are then stored in the memory 30 of the radiotelephone 10. As noted above, each separate color-code may be a single color or a combination of multiple colors.

When an event such as an incoming phone call or a voice mail message occurs, the microprocessor 25 first determines the identity of the event by searching the data entered in each field or group which is stored in the memory 30. If the microprocessor 25 finds a match, then the appropriate data group or field and corresponding color-code are determined. Microprocessor 25 then actuates the indicia 15 to display the color or colors corresponding to the appropriate color-code.

As noted above, the indicia 15 may comprise a rear-lit colored lens device, a light-emitting diode (LED) device, or a liquid-crystal display (LCD) device. Again, at least one color-coded indicia 15 is used on at least one surface of the telephone 10. However, multiple color-coded indicia 15 may be used.

Figure 3:
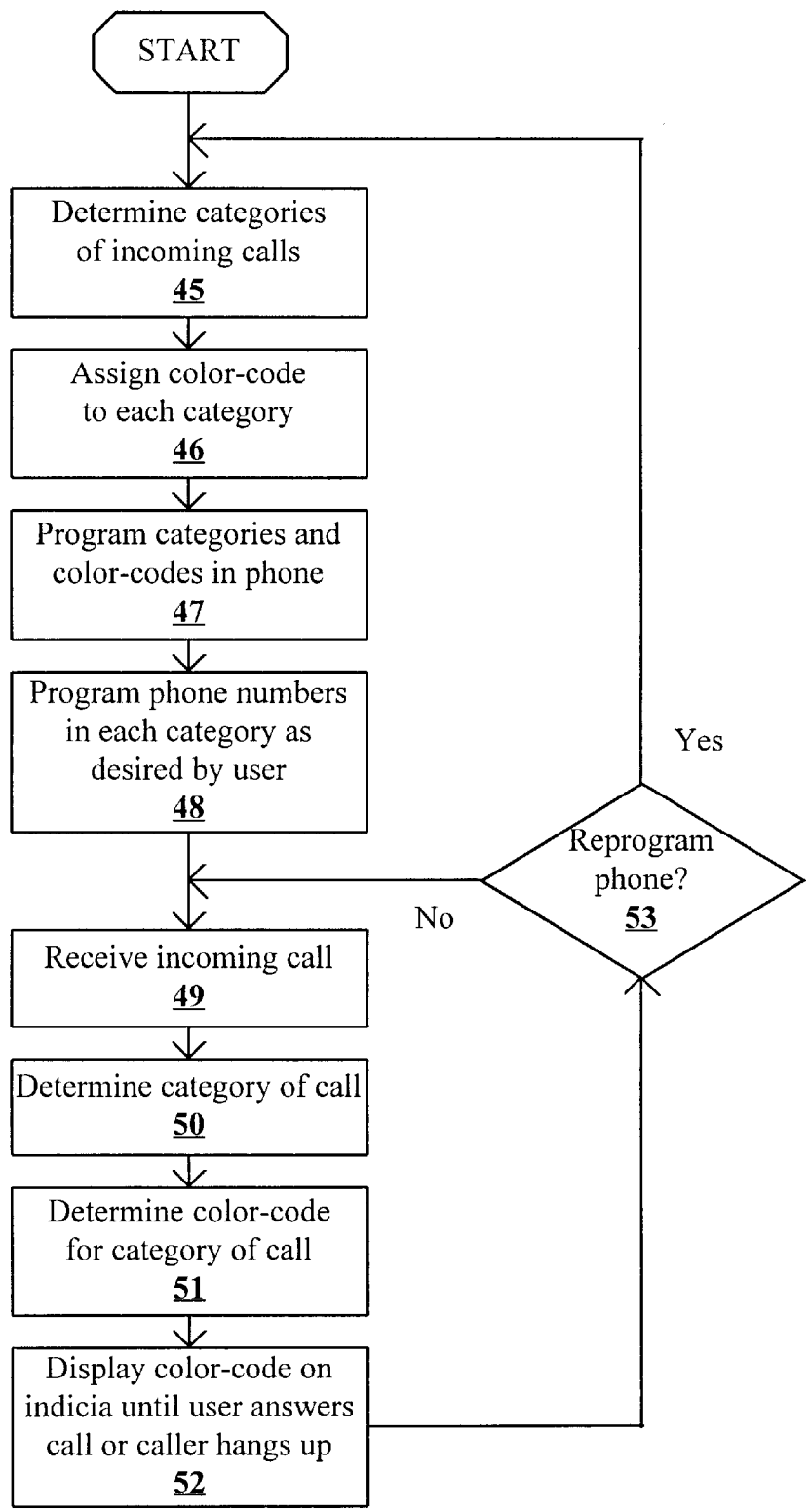
FIG. 3 is a flow chart illustrating the operation of the system when processing incoming calls.
Figure 4:
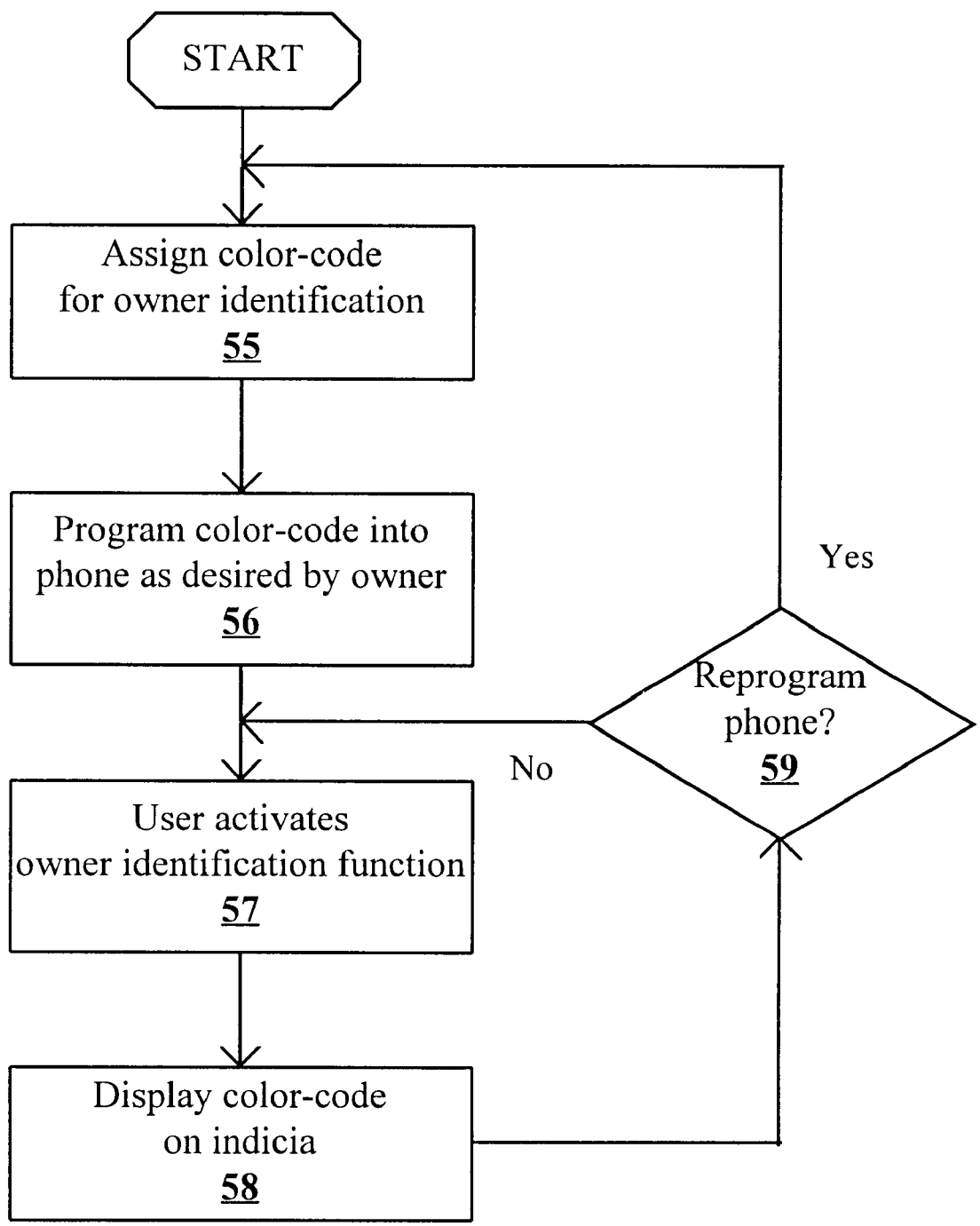
FIG. 4 is a flow chart illustrating the operation of the system when processing other data.
Figure 5:
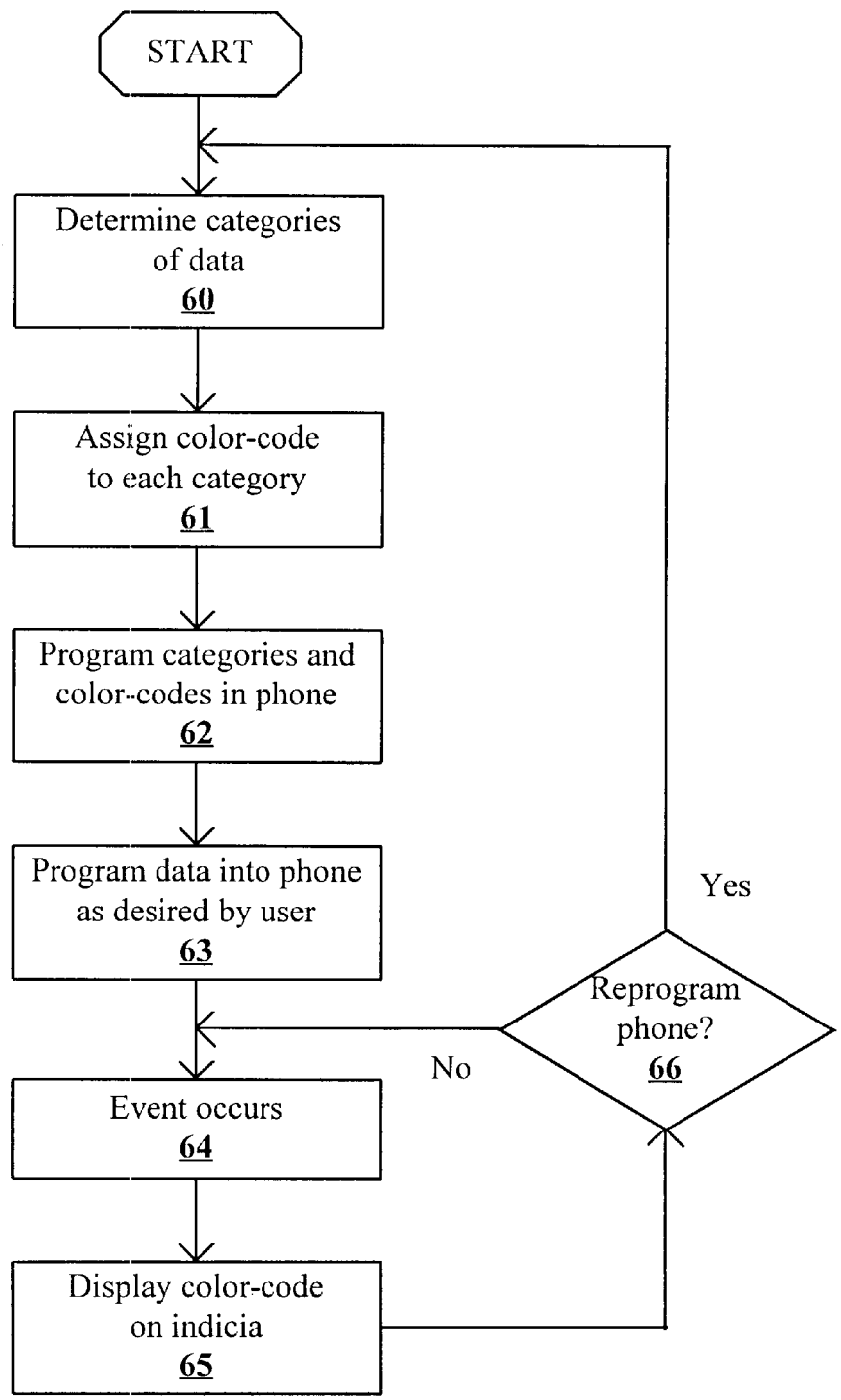
FIG. 5 is a schematic illustration of an alternate method of implementing the visual notification system of the present invention.

The visual identification system of the present invention may be used in various ways to communicate information to the user or to another person situated within eyesight of the telephone and color-coded indicia 15. In one embodiment, the visual identification systems determines a category or type of an incoming call and then communicates the type or category of that call via color-coded signals emitted by the indicia 15 (FIG. 3). In another embodiment of the present invention, the visual identification system produces color-coded signals that specifically identify a certain telephone (FIG. 4). This obviously allows a telephone owner to quickly identify his or her portable telephone among a group of like telephones. In still another embodiment, the visual identification system identifies other types of stored data or information via color-coded signals (FIG. 5).

Referring now to FIG. 3, the method for identifying incoming phone calls is shown in greater detail. Incoming calls are divided into categories such as emergency, friends, family, and work-related. A default category would include unknown callers. This step or function of determining the categories of incoming calls is shown in function block 45. These categories and the corresponding color-code for each category are then programmed into the microprocessor 25 of the radiotelephone 10 via the keypad 20 (function blocks 46,47). After each category has been defined, the user then programs the telephone numbers of expected callers under each of the defined categories (function block 48). This data is stored in the memory 30.

When an incoming call is received at the microprocessor 25 via the receiver module 35, the microprocessor 25 identifies the telephone number of the caller (function block 49). The microprocessor 25 then searches the memory 30 for a matching telephone number among the data previously programmed by the user. If a match is found, the microprocessor 25 further determines the category under which the telephone number was programmed (function block 50). Finally, the corresponding color-code is identified and a signal sent to the indicia 15 to activate that color-code (function block 51). The color-code may be displayed on the indicia 15 as a solid light, a blinking light with a variable blinking rate, or a light activated simultaneously with the ringing of the radiotelephone 10. The color-code is displayed on the indicia 15 until the user answers the phone call or the calling party terminates the attempted call (function block 52). When either event occurs, the display of the color-code on the indicia 15 ceases. The process then reiterates through the procedure as described in this paragraph for subsequent incoming calls (decision block 53). The user may, of course, also reprogram the radiotelephone 10 at any time to change the identifiable categories of calls (decision block 53).

To illustrate the process of identifying incoming calls, assume the radiotelephone 10 is equipped with an indicia 15 capable of displaying the colors blue, yellow, green, and red. The user chooses three categories of calls: friends, family, and work-related calls. The user then assigns the color blue to the friends category, the color yellow to the family category, the color green to the work-related category. The color red is assigned by the radiotelephone 10 to the default or unknown caller category. This data is programmed into the radiotelephone 10 by the user. Subsequently, the user programs numbers for friends and under the friends category, numbers for family members under the family category, and numbers for supervisor and co-workers under the work-related calls category.

Now that the radiotelephone 10 has been programmed, a telephone call from the user's spouse is received. The microprocessor 25 identifies the call as belonging to the family category and activates the color yellow on the indicia 15. Similarly, a call from a friend would result in the activation of the color blue and a call from the user's supervisor would activate the color green. If the call was from a telemarketer, the color red for unknown caller would be activated on the indicia 15 since this number was never programmed by the user. Thus, even if the user was across a room from the radiotelephone 10, the user would be able to identify the category of the caller. This feature would be very useful in helping the user to decide whether to accept the incoming phone call.

Referring now to FIG. 4, the procedure for utilizing the ownership identification feature is shown. Here, the owner identification field or group is permanently programmed into the radiotelephone 10 and assigned a default color-code. The user of the radiotelephone 10 is given the ability to change the default color-code for owner identification (function blocks 55,56). If the user places the radiotelephone among other radiotelephones on a table, the user may activate the owner identification mode either before laying down the radiotelephone 10 or when the user needs to retrieve the radiotelephone 10 from the table (function block 57). When the owner identification mode is activated, the programmed color-code is displayed on the indicia 58. The same color-code will be used for owner identification on subsequent occasions unless the radiotelephone 10 is reprogrammed by the user (decision block 59).

To continue with the above example to illustrate the owner identification process, assume the pre-programmed owner identification color-code comprises solid blue and red lights. The user of the radiotelephone 10 could reprogram this feature such that the identifying color-code would be a repeating green light/yellow light/red light sequence (like a stop light), a blinking yellow light, or a host of other combinations.

Assume further that the user attends a business meeting where the radiotelephone 10 is to be laid on a table with other similar radiotelephones. The user simply activates the owner identification function and the color-code is displayed on the indicia 15. At the close of the meeting, the user simply looks for his or her personal color-code to identify the proper radiotelephone 10. Even if the owner identification feature was not activated prior to laying down the radiotelephone 10, it would be easy for the user to identify the proper radiotelephone 10 by activating the feature on each phone and looking for the proper color-code.

Referring now to FIG. 5, the general procedure for other groups or fields of data is shown. Other fields of data may include alarms, memos, and voice mail message indicators. Once the various fields have been determined and color-codes assigned (function blocks 60,61), the user programs the fields and corresponding color-codes into the radiotelephone 10 or activates the preprogrammed fields and assigns the chosen color-codes (function blocks 62). The user then programs other data to be identified such as times and dates for alarms (function block 63). Since other fields such as memo and voice mail message indicators would be preprogrammed features in the radiotelephone 10, only the user-preferred color-codes would need to be programmed (function block 62). Once the color-codes for these fields have been programmed by the user, the microprocessor 25 displays the appropriate color-code (function block 65) on the indicia 15 when an event corresponding to one of these fields occurs (function block 64). As before, the user may reprogram these features at any time (decision block 66).

To illustrate these functions, assume the user programs an alarm to be activated at a time on a date when he or she desires to make a call. When that time and date is reached, the appropriate color-code, for example a blinking green light, will be displayed on the indicia 15 to alert the user. Similarly, if the user is not within the vicinity of the radiotelephone 10 and a caller leaves a voice mail message, the indicia 15 will display the corresponding code, for example, a repeating sequential blue and yellow light combination, to notify the user of the presence of the voice mail message.

For any of the described modes, once the appropriate color-code is determined by the microprocessor 25, it is displayed on the indicia 15 in a manner corresponding to the nature of the event. More specifically, the code could be displayed as a solid light, a flashing light with a variable blinking rate, or as a sequence of various lights both blinking and solid. The color-code would be removed from the indicia 15 after a predetermined time period also corresponding to the nature of the event. For instance, a voice mail message color-code indicator would be constantly activated until the user of the radiotelephone 10 manually erased the code or checked the voice mail. On the other hand, a color-code indicator for an incoming call would be erased either when the user answered the call or when the caller hung up and terminated the call.

Figure 6:
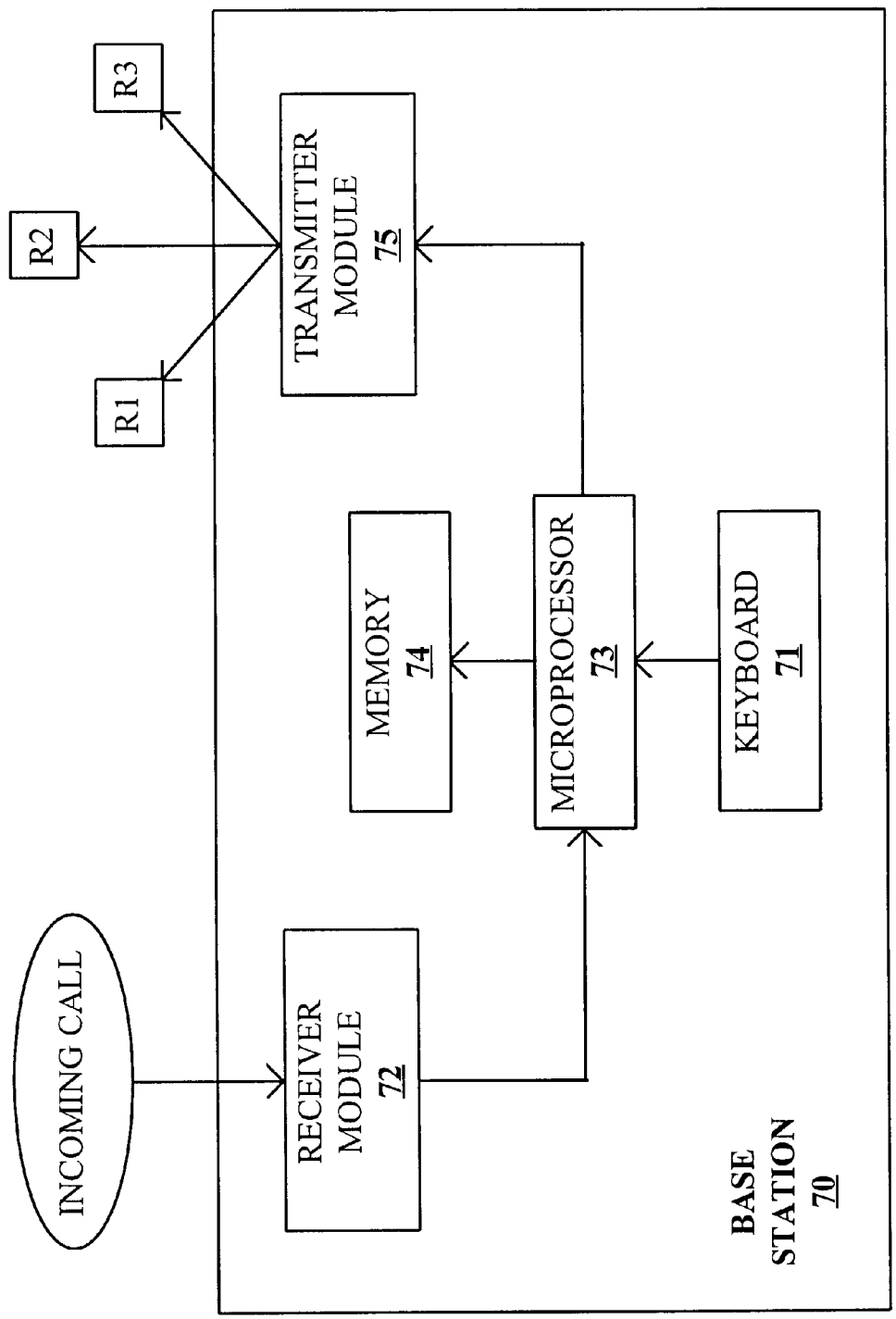
FIG. 6 is a schematic illustration of still another alternate method of implementing the visual notification system of the present invention.

FIG. 6 illustrates an alternate method of accomplishing the color-coding of the desired data fields. By this method, a base station 70, such as a phone company's switching station or the user's personal computer, may be programmed to perform the color-coding functions. As such, the various fields are established, each field assigned a particular color-code, and data then entered under each field as determined by the user at the keyboard 71 of the base station 70. Thus, for example, any incoming call would be routed through the receiver module 72 of the base station 70 and sorted by the microprocessor 73. The call would then be assigned the corresponding color-code as stored in the memory 74 prior to being transmitted, via the transmitter module 75, to the appropriate radiotelephone (R1, R2, R3, . . . ) in the network. Once received at the radiotelephone, the function of the microprocessor in the radiotelephone would be to activate the corresponding color-code on the indicia. This alternate method would have the advantage that multiple radiotelephones belonging to one user and operating on the same phone number would not need to be separately programmed. The data would only need to be programmed once and the categories would be consistent between the individual radiotelephones.

The alternate method illustrated in FIG. 6 may also be combined with the previous method of programming the radiotelephone to form a system whereby the fields and corresponding color-codes are determined at a base station. The data for each field would then be programmed into each radiotelephone by the individual user. Thus, regardless of the methodology used to accomplish the programming of the various fields and the data therein, the main advantage in the present invention is the color-coding of the data to be communicated to the user of the radiotelephone.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended claims are intended to be embraced therein.

What is claimed is:

1. A method of categorizing incoming cellular telephone calls and visually indicating on a telephone the category of an incoming call, comprising the steps of:

a) establishing a series of distinctive incoming call categories and assigning certain incoming telephone numbers to respective categories;

b) programming the categories and incoming telephone numbers into a microprocessor that processes incoming calls to the cellular telephone, and linking each call category with a different color coded signal;

c) for certain incoming calls to the cellular telephone, recognizing the incoming phone number and identifying the category of the incoming phone number;

d) directing a distinct signal representative of the identified category to color emitting indicia associated with the telephone; and e) actuating the color emitting indicia and producing a distinctive color coded signal that identifies the specific category of the incoming call to the cellular telephone.

2. The method of claim 1 wherein the microprocessor is contained within the cellular telephone and the step of programming categories and incoming telephone numbers into the microprocessor is performed by a user.

3. The method of claim 1 wherein the microprocessor is located at a base station remote from the telephone.

4. The method of claim 1 wherein the color emitting indicia is disposed within the housing of the cellular telephone thereby permitting an emitted color-coded signal to be seen.

5. The method of claim 1 including continuously emitting the color-coded signal until the incoming call is answered or the caller terminates the call.

6. A telephone programmable to visually indicate the category of an incoming telephone call comprising:

a) a housing structure;

b) color-coded indicia formed in the housing structure for emitting a series of different color-coded signals;

c) a programmable microprocessor and associated memory with the programmable microprocessor being programmed to include a series of incoming call categories and an array of incoming telephone numbers with each incoming telephone number being linked to a specific category such that the microprocessor and associated memory is operative to categorize incoming telephone calls; and d) means for detecting an incoming telephone number that corresponds to a programmed telephone number and associating that incoming telephone number with an incoming call category and directing an actuating signal corresponding to that category to the color-coded indicia so as to cause a color code to be emitted from the telephone that identifies the category of the incoming telephone call.

7. The telephone of claim 6 wherein the microprocessor and associated memory are contained within the housing of the telephone.

8. The telephone of claim 6 wherein the color-coded indicia includes a series of liquid crystal displays.

9. A method of visually indicating on a telephone categories of incoming calls comprising the steps of:

a) programming a series of distinct incoming call categories into a microprocessor associated with the telephone;

b) programming an array of incoming telephone numbers into the microprocessor and linking certain incoming telephone numbers with certain categories;

c) storing the program categories and incoming telephone numbers in a memory associated with the microprocessor;

d) assigning a specific color code to each category;

e) for each incoming call, scanning the memory to determine if the phone number of the incoming call is stored in memory;

f) when the incoming phone number is stored in memory, determining the category link with the incoming phone number; and g) directing a signal representative of the identified category to a color-coded indicia formed on the telephone and actuating the color-coded indicia so as to emit a color code that specifically identifies the category of the incoming call.

10. The method of claim 9 wherein the microprocessor is contained within a housing of the telephone.

11. The method of claim 9 wherein the microprocessor is remotely located away from the phone at a base station.

12. A cellular telephone having a quick recognition visual notification system, comprising:

a) a housing structure;

b) a color-coded indicia formed in the telephone for emitting color-coded signals;

c) a programmable microprocessor and an associated memory for receiving programmed identification data and storing the same therein;

d) wherein the programmable microprocessor and associated memory are programmed to include a series of incoming call categories and an array of incoming telephone numbers with each incoming telephone number being linked to a specific incoming call category such that the microprocessor and associated memory are operative to identify the incoming call category corresponding to each incoming telephone call; and e) wherein the microprocessor and associated memory are linked with the color coded indicia such that the color coded indicia upon actuation emits a color coded signal that is representative of the programmed identification data identified by the microprocessor, such that the color coded indicia emits a particular color coded signal that in-turn specifically identifies the category of the incoming call.

13. The telephone of claim 12 wherein the microprocessor and memory are operative to identify an incoming call and to cause the color-coded indicia to emit a distinct color code signal that identifies that incoming call.

\* \* \* \* \*